(No Model.)
J. E. CASEY & A. W. BROWNE.
APPARATUS FOR ADMINISTERING ENEMA OF OXYGEN.
No. 402,302. Patented Apr. 30, 1889.
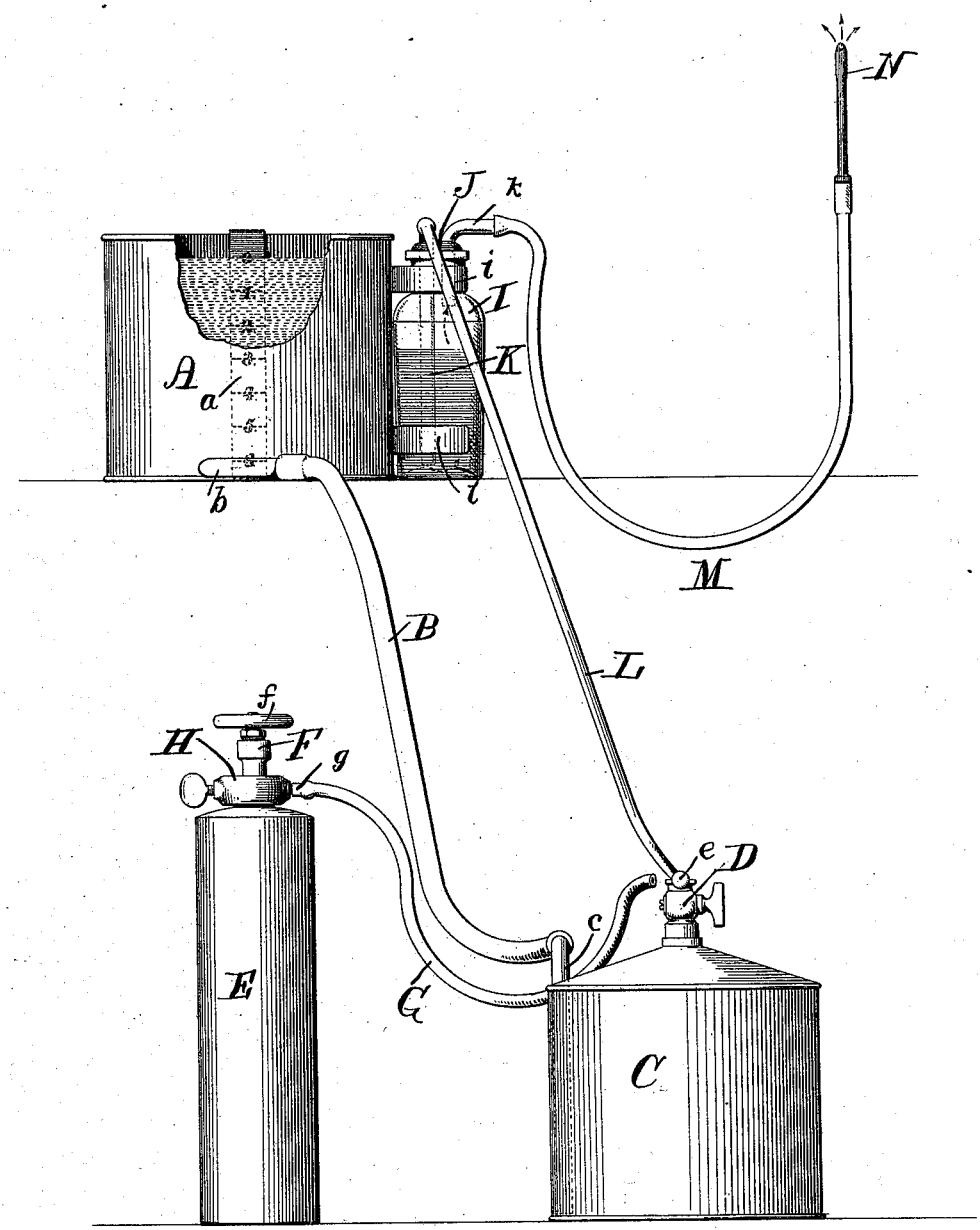

UNITED STATES PATENT OFFICE.

JOHN E. CASEY, OF TOTTENVILLE, AND ARTHUR W. BROWNE, OF PRINCE'S BAY, NEW YORK, ASSIGNORS TO THE S. S. WHITE DENTAL MANUFACTURING COMPANY, OF PHILADELPHIA, PENNSYLVANIA.

APPARATUS FOR ADMINISTERING ENEMA OF OXYGEN.

SPECIFICATION forming part of Letters Patent No. 402,302, dated April 30, 1889.

Application filed November 2, 1888. Serial No. 289,783. (No model.)

*To all whom it may concern:*

Be it known that we, JOHN E. CASEY, of Tottenville, in the county of Richmond and State of New York, and ARTHUR W. BROWNE, of Prince's Bay, in said county and State, have jointly invented certain new and useful Improvements in Apparatus for Administering Enema of Oxygen, of which the following is a specification.

Our invention relates to improvements in enema apparatus especially adapted for administering oxygen gas; and our objects mainly are to provide apparatus for administering enema of oxygen for absorption into the system by way of the liver, of simple construction, adapted to be conveniently operated, and by which there may be administered with certainty any desired quantity of oxygen.

In an application for Letters Patent of the United States filed by us simultaneously herewith we have described and claimed improved apparatus for administering oxygen by inhalation, and we make no claim herein to features described and claimed or claimable in said application.

In the inhalation of oxygen a portion only of the gas inhaled into the lungs is extracted by them or utilized by absorption into the system, some of the gas escaping by exhalation along with the air passing from the lungs. The oxygen received into the lungs and absorbed by them passes at once to the left side of the heart, and thence through the arterial system to the entire body, so that the liver receives no more than its due proportion of the oxygen. The chief source of blood supply to the liver is the portal circulation, and oxygen introduced into the lower port of the alimentary canal is at once received through the venous absorbents into the portal circulation, through which it is conveyed directly to the liver. When, therefore, it is desired to introduce a considerable quantity of oxygen into the system for the purpose of encouraging the oxidation process by which effete matters, especially those which are acted upon by the liver, are disintegrated and prepared for elimination, the oxygen enema affords a means by which the oxygen can be applied where it is most needed and in known quantity, as the oxygen introduced into the alimentary canal is entirely absorbed into the system and thus completely utilized.

The subject-matter deemed novel will hereinafter be designated by the claims after first describing, by the aid of the accompanying drawing, that organization of parts in accordance with our present invention which we deem preferable, but to all the details of construction and arrangement of which we do not wish to be understood as confining ourselves, as variations may be made therefrom without departure from essential features of our invention.

The drawing is a view in elevation of the apparatus ready for use.

An open-top water-supply tank or reservoir, A, preferably of metal, is shown as provided with a gage, *a*, so graduated in this instance as to indicate in quarts the amount of oxygen administered. When in the operation of administering the oxygen the water in the reservoir falls to the point 1 on the gage, one quart of oxygen is shown to have been administered; when it falls to the point 2 two quarts are shown to have been administered, and so on down the gage to the full capacity of the apparatus, as will further on be understood.

A short tube, *b*, best made of metal, fitted tightly to the reservoir at the side thereof and close to or against its bottom, serves as a coupling for a detachable tube, B, preferably of rubber, by way of which communicating connection is made between the lower portion of the reservoir and a close gas-tank or receiver, C, which, when the parts are in operative position, is located at a lower elevation than the reservoir, preferably about twenty-two (22) inches below the reservoir. The receiver is of somewhat less capacity than the reservoir, and is provided with a tube, *c*, which is fitted air-tight in its upper surface or top, and extends down to near its bottom, terminating at, say, half an inch from the bottom of the receiver. This receiver-tube is preferably made with a bend above the receiver, so that its upper end extends laterally to its lower portion. The tube B is detachably connected with the upper end of the receiver-tube c, and in this way communicating connection is made between the lower portions of the water-reservoir and gas-receiver, so that water passing by this connection to and from the reservoir and receiver enters and leaves them at or near their bottoms.

The receiver is provided at its top with a suitable valve, D. The top of the receiver is shown as of cone form with this valve at the apex of the cone. The valve shell or casing is provided above the valve with a suitable short laterally-projecting coupling-tube, e, opening into the valve-casing, and in this way communicating connection may be made between the receiver and an oxygen-holder and between the receiver and a water-trap vessel, as in turn to be explained.

A holder, E, containing compressed pure oxygen, is provided at top with a suitable valve, F, such as a compression-valve actuated by the wheel f. The valve when closed or seated prevents escape of oxygen from the holder, and when opened allows oxygen gas to flow to the receiver C by way of a connection such as follows: A tube, G, adapted to be detachably connected with the coupling-tube e of the casing of the gas-receiver valve D, is removably connected with the valve of the oxygen-holder by means of a short coupling-tube, g, entering an escape-port in the holder-valve casing and carried by a collar, H, clamped about the valve-casing. In this way communicating connection may be made between the holder and receiver when the valves F and D are opened.

A water-trap vessel, I, (shown as detachably connected with and upheld by the reservoir by means of spring-clamps i i,) is provided with a suitable readily-removable tight-fitting stopper, J, preferably of rubber. This stopper has two openings in it, in one of which is fitted an inlet-tube, K, and in the other an outlet-tube, k. These tubes fit gas-tight in the perforations in the stopper, and are of bent form, so that they project laterally to the trap-vessel above its stopper. The receiving-tube K, when properly adjusted, extends to within a short distance of the bottom of the trap-vessel, while the outlet-tube k terminates at its lower end but a short distance below the stopper. When the apparatus is to be used, the trap-vessel is partially (say two-thirds) filled with warm water heated to about 110° to 120° Fahrenheit, and in the space above the water the outlet-tube terminates at its lower end. A suitable tube, L, when detachably connected at its opposite ends with the trap-vessel inlet-tube K and the coupling-tube e of the valve-casing of the receiver, serves to make communicating connection between the receiver and trap-vessel. A flexible delivery-tube, M, is detachably connected at one end with the trap-vessel outlet-tube k, and at the other end connects with an ordinary injection-syringe point or tube, N, for insertion into the rectum.

In operation, the reservoir having first been filled with water and connected to the receiver by the tube B, the receiver-valve is opened, and the water, flowing into the receiver until it is filled, expels the air therefrom by way of the valve, after which the valve is closed. The relative proportions of the reservoir and receiver are such that after a sufficient amount of water passes from the reservoir to fill the receiver there is still enough water left in the reservoir to cover the outlet-tube at the bottom thereof. Should there be material waste of water by way of the valve of the receiver, the reservoir should at once be supplied with water corresponding in amount with that so wasted. The receiver having been filled with water and the air so expelled, communicating connection is made between the receiver and holder by way of the tube G, and the holder-valve actuated to allow oxygen to flow to the receiver, from which it forces the water back into the reservoir. When a sufficient amount of oxygen has been admitted to the receiver for forcing out the water and refilling, or nearly so, the reservoir, the receiver-valve is closed and the tube G disconnected therefrom, after which the oxygen is ready for administration. The trap-vessel having been supplied with water suitably heated so as to warm the oxygen gas which passes therethrough, and then closed by its stopper and adjusted in position with its inlet and outlet tubes in place, and connected, respectively, with the tube L and delivery or syringe-point tube M, connection is made between the trap-vessel and the receiver by way of the tube L. After the syringe-point has been properly inserted into the rectum, the receiver-valve is gradually opened, and the oxygen flows by way of the tube L and attached inlet-tube to the water-trap vessel near its bottom, thence up through the water, and passes by the short outlet-tube, delivery-tube, and syringe-point into the rectum, and is gradually absorbed into the system, as hereinbefore explained. As the oxygen passes from the receiver, water flows thereto from the reservoir, and as the water-level falls in the reservoir the gage indicates with exactness the amount of oxygen administered. The receiver-valve is closed when the desired amount of oxygen has been administered, and the apparatus removed and its parts separated, if desired.

Obviously, the supply of oxygen from the holder to the receiver after it is supplied with water, as described, may be cut off at any time desired instead of completely expelling the water therefrom, as above explained, and in this way when but a small quantity of the gas is to be administered waste is avoided.

We claim as our invention—

1. The combination of the water-reservoir, the receiver provided with the valve at one end and having communicating connection near its opposite end with the reservoir near its bottom, the holder, its valve, and the communicating connection between the holder and receiver by way of their valves, substantially as and for the purpose set forth.

2. The combination of the water-reservoir, the receiver provided with the valve at one end and having communicating connection near its opposite end with the reservoir near its bottom, and the water-trap vessel with which the receiver has communicating connection by way of its valve, substantially as and for the purpose set forth.

3. The combination of the water-reservoir, the gage, the receiver provided with the valve at one end and having communicating connection near its opposite end with the reservoir near its bottom, the water-trap vessel with which the receiver has communicating connection by way of its valve, and the delivery-tube having communicating connection with the water-trap vessel and provided with the syringe-point, substantially as and for the purpose set forth.

In testimony whereof we have hereunto subscribed our names.

JOHN E. CASEY.
ARTHUR W. BROWNE.

Witnesses:
C. THRALL,
GEO. D. HECK.